Aug. 4, 1959   J. A. LAWLER   2,898,436
CONTROL APPARATUS
Filed May 10, 1957
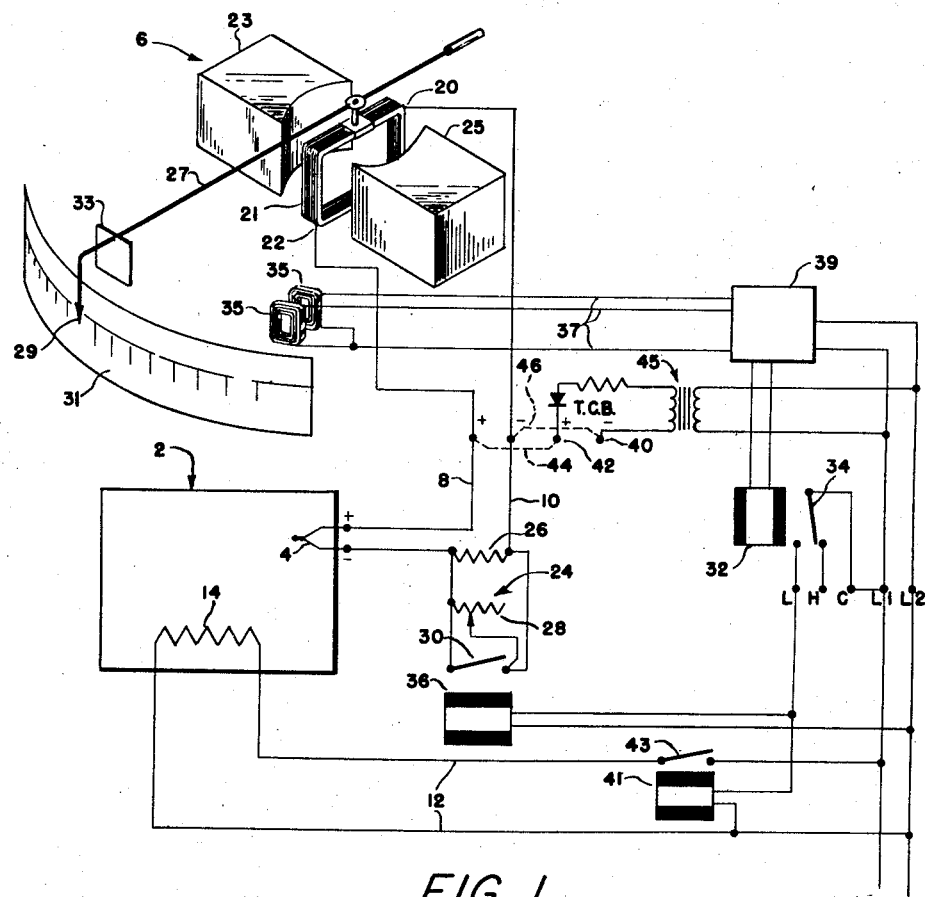
FIG. 1
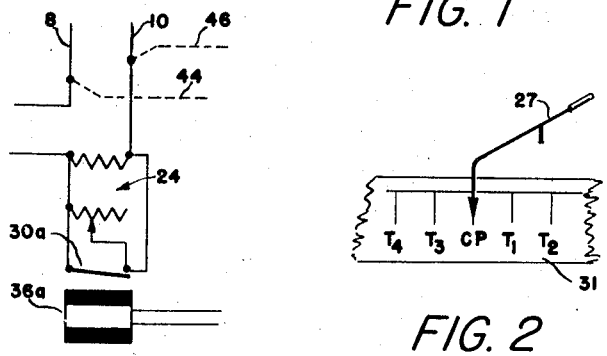
FIG. 3
FIG. 2
Inventor
Joseph A. Lawler
By Neil J. Driscoll Atty.

United States Patent Office 2,898,436
Patented Aug. 4, 1959

2,898,436

CONTROL APPARATUS

Joseph A. Lawler, Chicago Heights, Ill., assignor to Blue M Electric Company, Blue Island, Ill., a corporation of Illinois Application May 10, 1957, Serial No. 658,274

2 Claims. (Cl. 219—20)

The invention relates to an improved control arrangement having particular utility in providing highly sensitive control action in an efficient and economical manner.

Current technological development has increased the need for accurate and close control in many industrial and scientific applications, processes and the like. For example, in heating devices such as ovens and furnaces, the heretofore usual fluctuations of temperature in the heating zone have been rather marked when considered in the light of the control desired and in many instances necessary in modern applications.

In an effort to answer this need, control arrangements of various kinds are being offered commercially. One control device used is that known as the potentiometer type which generally offers satisfactory temperature control, but is subject to the serious commercial disadvantage that this equipment is relatively expensive. In many instances such control equipment is more expensive than the apparatus which it controls. This undesirable feature, of course, renders this control outside the practical scope of many users. A second type of relatively common control, namely the millivoltmeter type, is also commercially available. Its primary advantage is its small size, compactness and its relatively inexpensive cost. It has been found, however, that this equipment has not been able to satisfy the growing demand for close tolerance control in that its normal control span is too wide. Efforts to mechanically reduce the control span of this equipment have resulted in unsatisfactory operation, as for example, chattering and the like.

The invention here under consideration comprehends a refined circuit and control arrangement incorporated with the millivoltmeter type of control which materially increases the control sensitivity thereof and in addition thereto will not add materially to cost. In effect, the sensitive control standard frequently desired may, by use of this invention, be achieved without extremely expensive outlay for equipment.

It is a general object of the invention to provide a relatively low cost, highly sensitive control arrangement.

Specifically, it is an object of the invention to provide means to anticipate control movement wherein said control is operatively associated with and responsive to a variation of the controlled equipment from a set or determined control point. For example, a thermocouple sensing arrangement may be associated with an oven and also operatively connected to a controller whereby the sensed variation in temperature of the oven is anticipated with the result that the energizing and de-energizing of the heat applying device in the oven is more accurately coordinated with the actual temperature variation therein. As a result of this anticipating function, a set operating control point of an oven for example may be maintained within limits that heretofore could not be achieved with relatively low cost equipment.

These and other objects of the invention will become apparent in the course of the following description and from an examination of the concerned drawings, wherein:

Figure 1 is a diagrammatic arrangement functionally illustrating the circuit employed.

Figure 2 is a diagrammatic illustration of the control action, and

Figure 3 is a fragmentary illustration showing a modification of the structure of Figure 1.

It will be understood that the invention illustrated and hereafter claimed may be used to increase the sensitivity of the controlling arrangements on a variety of types of control equipment. The invention is, as illustrated, applied to an electrically powered furnace. In addition, for example, it may be used to control the application of fuel to a gas or oil fired furnace by merely providing that the control be operatively associated with a valve or the like controlling the flow of fuel to the furnace and in a conventional manner. Other applications may reasonably occur to those skilled in the art.

Describing the invention in detail, it will be understood that numeral 2 indicates a furnace having positioned in the heating zone therein a thermocouple sensing element 4. It will be understood by those skilled in the art that the thermocouple 4 will create a voltage proportional to the temperature level within the furnace 2. A controller is diagrammatically indicated generally at 6, and is operatively connected to the thermocouple 2 by means of lines 8 and 10. It will be understood that the controller 6 is a conventional sensitive device which is operative to turn on and off electrical power to a circuit 12 connected with a heat element 14 located in the furnace 2.

As a general rule, the sensitivity of the controllers here under consideration is such that a minimum of plus or minus five degrees above or below the control point must be sensed before the oven is turned on or off. For example, a controller of this nature having control point setting at 1000° F. would dictate that the sensed temperature rise approximately to 1005° F. before the controller would de-energize the heating element. Likewise, a reduction of sensed temperature in the heating zone, or to a sensed level of approximately 995° F. would be required before the heating elements would be energized and act to increase the temperature in the oven.

In addition to this relatively wide instrument control span, it will be understood that the actual temperature in the oven is normally at variance with the sensed temperature, that is, it usually leads it in either direction. For example, should the sensed temperature be found to be a 1005° F. during the heat on cycle, the actual temperature in the oven could be many degrees thereabove as a result of the normal lag between actual and sensed temperature. Additionally, during the heat off cycle of the oven, the actual temperature therein may fall many degrees below the sensed 995° F. before the control energizes the heating elements. It will thus be seen that the variation in temperature as a result of the tolerance or control span limits of the controller, is in fact magnified in the actual temperature variation in the oven. It is the purpose of the invention here disclosed to substantially reduce actual control point variation by artificially reducing the time required for the controller to travel through its control span thus providing substantially increased sensitivity.

Referring again to the figures, it will be seen that lines 8 and 10 connect at 20 and 22 with a coil 21 mechanically interposed between permanent magnets 23 and 25 of opposite polarity. An indicating arm 27 is connected to the movable coil 21 and is provided with an indicating pointer 29 in readable relation with a scale 31. The arm 27 also carries a vane or plate 33 movable therewith and in operative relation with pick up coils 35, 35, that is, in response to movement of the arm 27 the vane 33 telescopically moves between the coils 35, 35 to interrupt an existing electrical effect therebetween and thereby vary an output signal therefrom. While not shown it will be understood by those skilled in the art that coils 35 may be mechanically variably positioned to provide different control point settings. It will also be readily understood that the position of coil 21, connected arm 27 and carried van 33 will be determined by the level of the voltage impressed across the coil 21 in response to the sensed temperature at thermocouple 4 and in the conventional manner.

A resistance, indicated generally at 24, may be introduced into the line 10. In a preferred embodiment of the invention, the resistance 24 comprises a small fixed resistance 26 and a manually variable resistance 28 in parallel therewith. A switch 30 is also connected in parallel with the resistance 24 in such a manner that upon closing thereof said resistance will be short circuited or cut out of the circuit 10.

Returning to the controller 6, it will be understood that any output signal from coils 35 is conveyed via lines 37 to an amplifier 39 which in turn energizes a relay 32 which is operative to close a switch 34, closure of switch 34 completes circuits to relays 36 and 41 delivering power to the heat element 14 through closure of switch 43 in the circuit 12 and causing closure of switch 30. Closure of switch 30 shorts out the resistance 24 in the circuit 10. It will be noted that relays 36 and 41 may be electrically or mechanically interlocked in any conventional manner with the relay 32 and the action of switch 34 to produce the desired result. Upon opening of the switch 34 in response to the action of the control 6, relays 36 and 41 are deenergized and the switches 30 and 43 opened whereby the resistance 24 is returned to the circuit 10 and the circuit 12 to element 14 broken.

Returning to the parallel arrangement between the resistances 26 and 28, it will be understood by those skilled in the art that such an arrangement of a fixed and variable resistance provides a range variation in the total resistive effect in the line 10. Noting that the actual control span of the controllers heretofore considered varies from instrument to instrument depending on slight variations in physical properties thereof and that the amount of total resistance in the circuit 10 determines the extent of anticipation (as heeinafter explained), the particular parallel arrangement of a fixed and variable resistance therefor provides for convenient variation of the effective resistance in line 10 thereby providing convenient adjustment and adaptation to the given unit. Further, in any given controller, the anticipating effect may be changed by a variation in this effective resistance. With this in mind, it will be understood that the parallel resistance arrangement shown, though desirable, is not absolutely necessary to the operation of the arrangement.

Attention is now directed to Figure 2, which schematically illustrates the limits of the controller 6. Assuming the line CP is illustrative of the control point set in the controller 6, the upper limit of the control span may be illustrated by line $T_2$ and the lower limit illustrated by line $T_4$, that is, in normal controller operation, the control element will be required to fall from the point CP to the lower limit $T_4$ before the controller energizes the heating elements of the furnace, and, conversely, the controller element will be required to move up scale to the upper limit $T_2$ before the controller will de-energize the heating elements of the furnace. Movement of the control element through the distance $T_4$—$T_2$, of course, takes considerable time with the result that the actual temperature in the furnace is subject to the variations hereinbefore indicated. Artificial control movement through a major portion of the control span is accomplished in the following manner: Assuming the oven 2 is at a heat condition at the lower end of the span, that is, the control element is approaching the point $T_4$. Under this condition it will be appreciated that the element 14 is de-energized, the switches 30, 34 and 43 are open and the resistance 24 is in the circuit 10. As the lower limit $T_4$ is reached, the controller 6 through relay 32 closes switch 34 energizing relays 36 and 41, closing switches 30 and 43, energizing heating element and cutting out the resistance 24 from the circuit 10. The potential or voltage generated by the thermocouple 4 is now fully impressed across the coil 21 without artificial reduction due to the presence of the resistance 24. The effect of shorting out the resistance 24 under this circumstance materially increases the impressed voltage on the controller 6 with the result that the control element is driven to point $T_1$ on the control span. Thereafter, a slight increase in sensed temperature change by the thermocouple 4 induces a direct movement of the control element through the relatively short distance $T_1$—$T_2$, the latter being the point at which the controller de-energizes relay 32 opening switch 34, which in turn opens switches 30 and 43. Upon opening of switch 30 the resistance 24 is cut back into the circuit 10 which in turn artificially reduces the voltage impressed on the coil 20 by the thermocouple 4, thus driving the control element from the point $T_2$ to a point $T_3$ adjacent the lower limit $T_4$ of the control span. Thereafter the thermocouple 4 need only sense a temperature change corresponding to the distance $T_3$—$T_4$ on the control span to energize relay 32 and repeat the above cycle. In effect, the selective removal and insertion of the resistance 24 in the circuit 10 causes an artificial rapid travel of the control element through a major portion of the control span. Thus, to energize and de-energize the heat applying means of the furnace only requires that the thermocouple senses a relatively small change in temperature variation in the oven. It will be understood that the amount of artificial movement of the control element is proportional to the amount of resistance selectively entered into and taken out of the circuit 10. Further, the amount of this resistance can be varied by varying the resistance 28. This feature has utility in view of the fact that the span limit of each controller varies and further offers a means to vary the amount of artificial anticipation as desired.

Directing attention again to Figures 1 and 3 (Figure 3 being a modified showing of a fragment of Figure 1), it will be understood that many controllers 6 are provided with a safety device known as thermocouple break or TCB. Essentially, thermocouple break protection amounts to an artificial impressing of a determined voltage across the thermocouple connection points. In normal circumstances the low resistance of the thermocouple circuit shorts this impressed voltage to an extremely small value that does not materially affect the operation of the controller. However, if the thermocouple circuit 8 and 10 should be opened accidentally, the thermocouple break voltage is impressed directly across the coil 21 and its relatively high resistance which drives the controller element 27 up scale and over the shut off point $T_4$ of the control span. This safety feature prevents oven operation in the event of thermocouple failure.

To illustrate this arrangement points 40 and 42 are shown on the controller communicating with a source of thermocouple break voltage 45. Dotted lines 44 and 46 show the thermocouple break feature wired across the thermocouple circuit. In this circumstance, the resistance shorting switch becomes a normally closed switch as illustrated at 30a in Figure 3. That is, switch 30a shorts the resistance 24 from the circuit in response to action of relay 36a when switch 34 is open. In effect, the presence of the thermocouple break feature wired into the circuit merely reverses the direction of action above described and in this circumstance the resistance 24 is out of the circuit when the heating elements are de-energized and the control element is moved down scale toward its lower limit $T_4$. From this it follows that the resistance 24 is in the circuit 10 when the switch 34 is closed resulting in an artificial movement of the controller element up scale to the point T₂. The presence of the resistance 24 merely has the effect of causing the thermocouple circuit to approach an open circuit condition with the result that a partial impressing of the thermocouple break voltage across the contacts 20 and 22 results and produces the desired anticipating action.

From the above it will be seen that I have provided a unique arrangement that anticipates normal control movement which in turn results in a marked increase in the sensitivity of the controller with which it is combined. From an oven or furnace operation standpoint it has been found that the application of this arrangement thereto results in the maintenance of an accurately controlled temperature therein heretofore impossible with this type of equipment. In short, the arrangement provides the highly desired sensitive control in a relatively inexpensive and efficient manner.

The invention as shown is by way of illustration and not limitation and may be subject to certain modifications, for example, one skilled in the art may provide multiple relay controlled switches to slightly modify the shown circuit and yet accomplish the same result without departing from the spirit of the invention or the scope of the appended claims.

What is claimed is:

1. In combination, a furnace having a controlled temperature chamber therein, heating means in the chamber, a voltage developing thermocouple adapted to be placed in the chamber, a furnace control device, a circuit connecting the device to the thermocouple, said device being operative to initiate the on and off operation of the heating means and comprising coil means movable in response to the voltage developed by the thermocouple, means operatively associated with the coil means and arranged to offer an output signal and variably responsive to the movement of the coil means, a first relay selectively energizable by the output signal, switch means closable by said first relay to provide circuit means to energize both a second relay and third relay, all of said relays being energized and deenergized simultaneously, second switch means closable by the energized second relay to establish a circuit to the heating means, a resistance in the first mentioned circuit between the device and the thermocouple, and third switch means connected to said first mentioned circuit in parallel with said resistance, said third switch means being closable in response to energizing of the third relay to selectively shunt said resistance out of the first mentioned circuit simultaneously with the establishment of said circuit to the heating means.

2. In a controlling arrangement to be used with a controlled member having associated therewith a power element to effectuate said control, the combination of sensing means operatively connectable to the member and arranged to put out a variable voltage in response to variations of the member from a determined condition, control means having a graduated control scale thereon, circuit means operatively interconnecting the sensing means and the control means to transmit said voltage to the control means, settable means in the control means to delineate a control point reflecting said determined condition, first and second actuating points spaced upscale and downscale from said control point whereby said actuating points define a control span bracketing said control point, said control means including changeable means arranged to receive said voltage and in response to an increase thereof to move through said control span in one direction to one of said actuating points and in a response to a decrease thereof to move through said control span in another direction to the other of said actuating points, means operatively associated with said actuating points to offer an ouput signal variably responsive to the movement of said changeable means to the respective actuating points, a power circuit connected to said power element, a first switch means in said power circuit to control power application to said element, resistance means in said circuit means, a second switch means associated with said circuit means and in parallel with said resistance means and operable to shunt said resistance means out of said circuit means, and means operatively responsive to said output signal to open and close said first and second switch means to selectively energize said power circuit and shunt said resistance means out of said circuit means, whereby upon movement of said changeable means to said first actuating point said changeable means is artificially moved toward said second actuating point and upon movement of said changeable means to said second actuating point said changeable means is artificially moved toward said first actuating point.

References Cited in the file of this patent

UNITED STATES PATENTS

| | | |
|---|---|---|
| 1,728,802 | Newill | Sept. 17, 1929 |
| 2,022,097 | Uehling | Nov. 26, 1935 |
| 2,218,502 | Breitenstein | Oct. 22, 1940 |
| 2,234,184 | MacLaren | Mar. 11, 1941 |
| 2,376,488 | Jones | May 22, 1945 |
| 2,602,916 | Anderson | July 8, 1952 |
| 2,761,052 | Knudsen | Aug. 28, 1956 |
| 2,819,371 | Aldrich et al. | Jan. 7, 1958 |